(12) United States Patent
Tomana et al.

(10) Patent No.: US 10,923,740 B2
(45) Date of Patent: Feb. 16, 2021

(54) FUEL CELL SEPARATOR, FUEL CELL JOINT SEPARATOR, AND POWER GENERATION CELL

(71) Applicant: HONDA MOTOR CO., LTD., Tokyo (JP)

(72) Inventors: Yu Tomana, Wako (JP); Kentaro Ishida, Wako (JP); Satoshi Oyama, Wako (JP); Masahiro Matsutani, Wako (JP); Akihito Giga, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 57 days.

(21) Appl. No.: 16/351,613

(22) Filed: Mar. 13, 2019

(65) Prior Publication Data

US 2019/0288300 A1    Sep. 19, 2019

(30) Foreign Application Priority Data

Mar. 15, 2018 (JP) .............................. JP2018-047416

(51) Int. Cl.
*H01M 8/0258* (2016.01)
*H01M 8/1004* (2016.01)

(52) U.S. Cl.
CPC ....... *H01M 8/0258* (2013.01); *H01M 8/1004* (2013.01)

(58) Field of Classification Search
CPC .......................... H01M 8/0258; H01M 8/1004
See application file for complete search history.

(56) References Cited

U.S. PATENT DOCUMENTS

| | | | |
|---|---|---|---|
| 2006/0090330 A1* | 5/2006 | Kauranen | H01M 8/0258 29/623.4 |
| 2010/0050421 A1* | 3/2010 | Fukaya | H01M 8/241 29/623.1 |

FOREIGN PATENT DOCUMENTS

JP            5295877            9/2013

* cited by examiner

*Primary Examiner* — Olatunji A Godo
(74) *Attorney, Agent, or Firm* — Amin, Turocy & Watson LLP

(57) ABSTRACT

A fuel gas supply passage is provided at a central position of one side of opposing sides of a separator. A fuel gas supply passage is provided close to a fuel gas flow field in comparison with any of a plurality of fluid passages provided along the one side. An identification mark of the separator is provided between the fuel gas supply passage and an outer peripheral end of the separator.

8 Claims, 4 Drawing Sheets

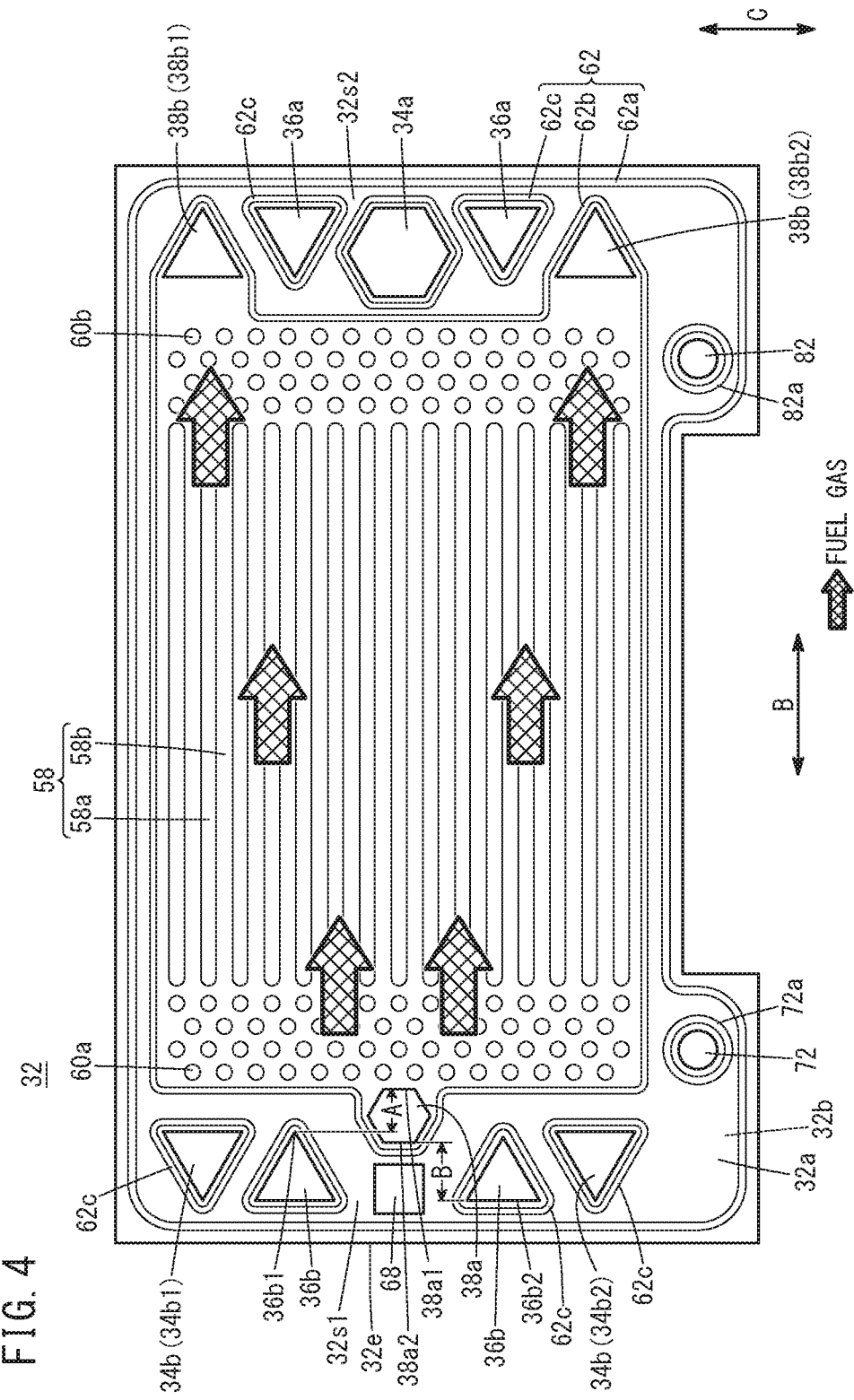

FUEL CELL SEPARATOR, FUEL CELL JOINT SEPARATOR, AND POWER GENERATION CELL

CROSS-REFERENCE TO RELATED APPLICATION

This application is based upon and claims the benefit of priority from Japanese Patent Application No. 2018-047416 filed on Mar. 15, 2018, the contents of which are incorporated herein by reference.

BACKGROUND OF THE INVENTION

Field of the Invention

The present invention relates to a fuel cell separator, a fuel cell joint separator, and a power generation cell.

Description of the Related Art

For example, a solid polymer electrolyte fuel cell includes a membrane electrode assembly (MEA). The membrane electrode assembly includes an electrolyte membrane, an anode provided on one side of the electrolyte membrane, and a cathode on the other side of the electrolyte membrane. The electrolyte membrane is a polymer ion exchange membrane. The membrane electrode assembly is sandwiched between separators to form a power generation cell. In use, generally, a predetermined number of fuel cells are stacked together to form, e.g. an in-vehicle fuel cell stack mounted in a vehicle.

A plurality of types of separators are used for the power generation cell. Specifically, the power generation cell includes a cathode side separator having an oxygen-containing gas flow field facing the cathode for allowing an oxygen-containing gas to flow the oxygen-containing gas flow field, and an anode side separator having a fuel gas flow field facing the anode for allowing a fuel gas to flow the fuel gas flow field (Intermediate separators are used additionally in the case of the fuel cell having so called skip cooling structure). In order to improve the operating efficiency at the time of assembling the fuel cell stack, it is desired to identify a plurality of types of separators easily. To this end, in a fuel cell disclosed in Japanese Patent No. 5295877, the separator has an identification mark of the separator.

SUMMARY OF THE INVENTION

The present invention has been made in relation to the above conventional technique, and an object of the present invention is to provide a fuel cell, a fuel cell joint separator, and a power generation cell, in which it is possible to provide an identification mark having desired quantity of information in a separator surface easily.

In order to achieve the above object, according to an aspect of the present invention, a rectangular fuel cell separator includes a reactant gas flow field configured to allow a reactant gas to flow in a separator surface direction, and a plurality of fluid passages extending through the fuel cell separator in a separator thickness direction, and formed along opposing sides of the fuel cell separator, on both sides of the reactant gas flow field, wherein a reactant gas supply passage is provided at a central position of one side of the opposing sides of the fuel cell separator, a pair of reactant gas discharge passages are provided in another side of the opposing sides of the fuel cell separator, on both sides opposing the reactant gas supply passage, the reactant gas supply passage is provided close to the reactant gas flow field in comparison with any of a plurality of other fluid passages provided along the one side, an identification mark of the fuel cell separator is provided between the reactant gas supply passage and an outer peripheral end of the fuel cell separator.

Preferably, the reactant gas supply passage is a fuel gas supply passage, and the pair of reactant discharge passages are a pair of fuel gas discharge passages.

Preferably, a pair of coolant passages are provided on both sides of the reactant gas supply passage along the one side, and a pair of other reactant gas discharge passages are provided on both sides of the pair of coolant passages along the one side.

Preferably, an opening area of the reactant gas supply passage is smaller than an opening area of any of the other fluid passages provided along the one side.

Preferably, in the other side, another reactant gas supply passage having a large opening area in comparison with the reactant gas supply passage at the one side is provided.

Further, according to another aspect of the present invention, a rectangular fuel cell joint separator is provided. The rectangular fuel cell joint separator includes a first reactant gas flow field provided on one surface of the fuel cell separator, and configured to allow a first reactant gas to flow in a separator surface direction, a second reactant gas flow field provided on another surface of the fuel cell separator, and configured to allow a second reactant gas to flow in the separator surface direction, and a plurality of fluid passages extending through the fuel cell joint separator in a separator thickness direction, and formed along opposing sides of the first reactant gas flow field and the second reactant gas flow field, wherein the fuel cell joint separator is formed by joining a first separator having the first reactant gas flow field and a second separator having the second reactant gas flow field together, a reactant gas supply passage is provided at a central position of one side of the opposing sides of the fuel cell joint separator, a pair of reactant gas discharge passages are provided in another side of the opposing sides of the fuel cell joint separator, on both sides opposing the reactant gas supply passage, the reactant gas supply passage is provided close to the first reactant gas flow field or the second reactant gas flow field in comparison with any of a plurality of other fluid passages provided along the one side, and an identification mark of the fuel cell joint separator is provided between the reactant gas supply passage and an outer peripheral end of the fuel cell joint separator.

Further, according to another aspect of the present invention, a power generation cell is provided. The power generation cell includes a pair of rectangular fuel cell separators and a membrane electrode assembly sandwiched between the pair of fuel cell separators, wherein one of the fuel cell separators includes a reactant gas flow field configured to allow a reactant gas to flow in a separator surface direction, and a plurality of fluid passages extending through the one fuel cell separator in a separator thickness direction, and formed along opposing sides of the one rectangular fuel cell separator, on both sides of the reactant gas flow field, wherein a reactant gas supply passage is provided at a central position of one side of the opposing sides of the one fuel cell separator, a pair of reactant gas discharge passages are provided in another side of the opposing sides of the one fuel cell separator, on both sides opposing the reactant gas supply passage, the reactant gas supply passage is provided close to the reactant gas flow field in comparison with any of a plurality of other fluid passages provided along the one side, and an identification mark of the fuel cell separator is provided between the reactant gas supply passage and an outer peripheral end of the one fuel cell separator.

In the fuel cell separator, the fuel cell joint separator, and the power generation cell, a reactant gas supply passage provided in one side of the opposing sides is close to the reactant gas flow field in comparison with any of the other fluid passages provided along the one side. Further, the identification mark of the fuel cell separator is provided between the reactant gas supply passage and the outer peripheral end of the fuel cell separator. In the structure, it is possible to provide a space for the identification mark in the separator surface easily. Accordingly, it becomes possible to arrange the identification mark having the desired quantity of information in the separator surface easily.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 4 is a plan view showing a second separator.

DESCRIPTION OF THE PREFERRED EMBODIMENTS

Hereinafter, a preferred embodiment of a fuel cell separator, a fuel cell joint separator, and a power generation cell according to the present invention will be describe with reference to the accompanying drawings.

Figure 1:
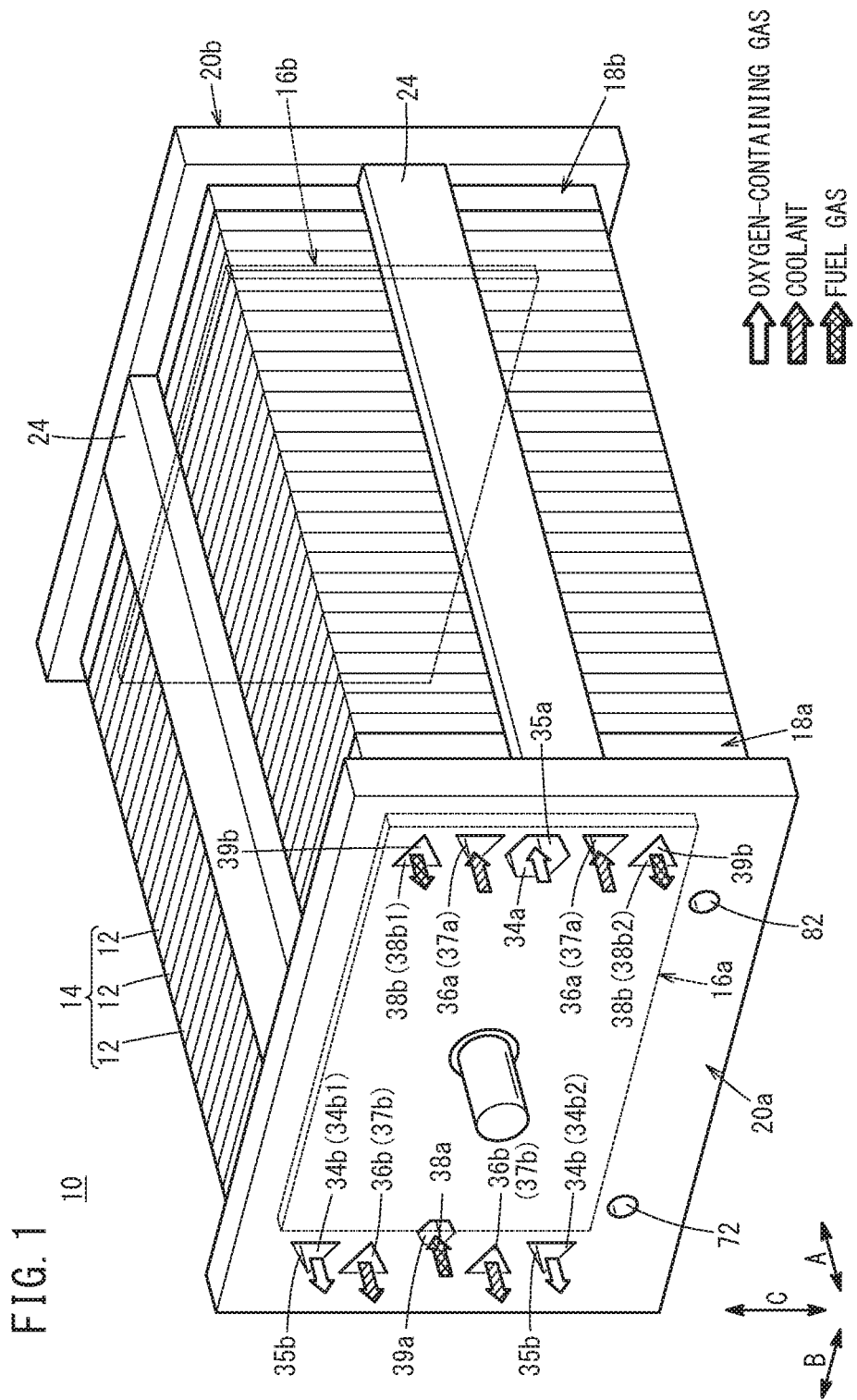
FIG. 1 is a perspective view showing a fuel cell stack having a power generation cell according to an embodiment of the present invention.

As shown in FIG. 1, a fuel cell stack 10 includes a stack body 14 formed by stacking a plurality of power generation cells (fuel cells) 12 in a horizontal direction (indicated by an arrow A) or in a gravity direction (indicated by an arrow C). For example, the fuel cell stack 10 is mounted in a fuel cell vehicle such as a fuel cell electric automobile (not shown).

At one end of the stack body 14 in the stacking direction indicated by the arrow A, a terminal plate 16a (power collection plate) is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b. The insulator 18a (one of the insulators 18a, 18b) is provided between the stack body 14 and the end plate 20a (one of the end plates 20a, 20b). The other insulator 18b is provided between the stack body 14 and the other end plate 20b. The insulators 18a, 18b are made of insulating material, such as polycarbonate (PC) or phenol resin, etc.

Each of the end plates 20a, 20b has a laterally elongated (or longitudinally elongated) rectangular shape. Coupling bars 24 are positioned between the sides of the end plates 20a, 20b. Both ends of the coupling bars 24 are fixed to inner surfaces of the end plates 20a, 20b to apply a tightening load to a plurality of stacked fuel cells 12 in the stacking direction indicated by the arrow A. It should be noted that the fuel cell stack 10 may have a casing including the end plates 20a, 20b, and the stack body 14 may be placed in the casing.

Figure 2:
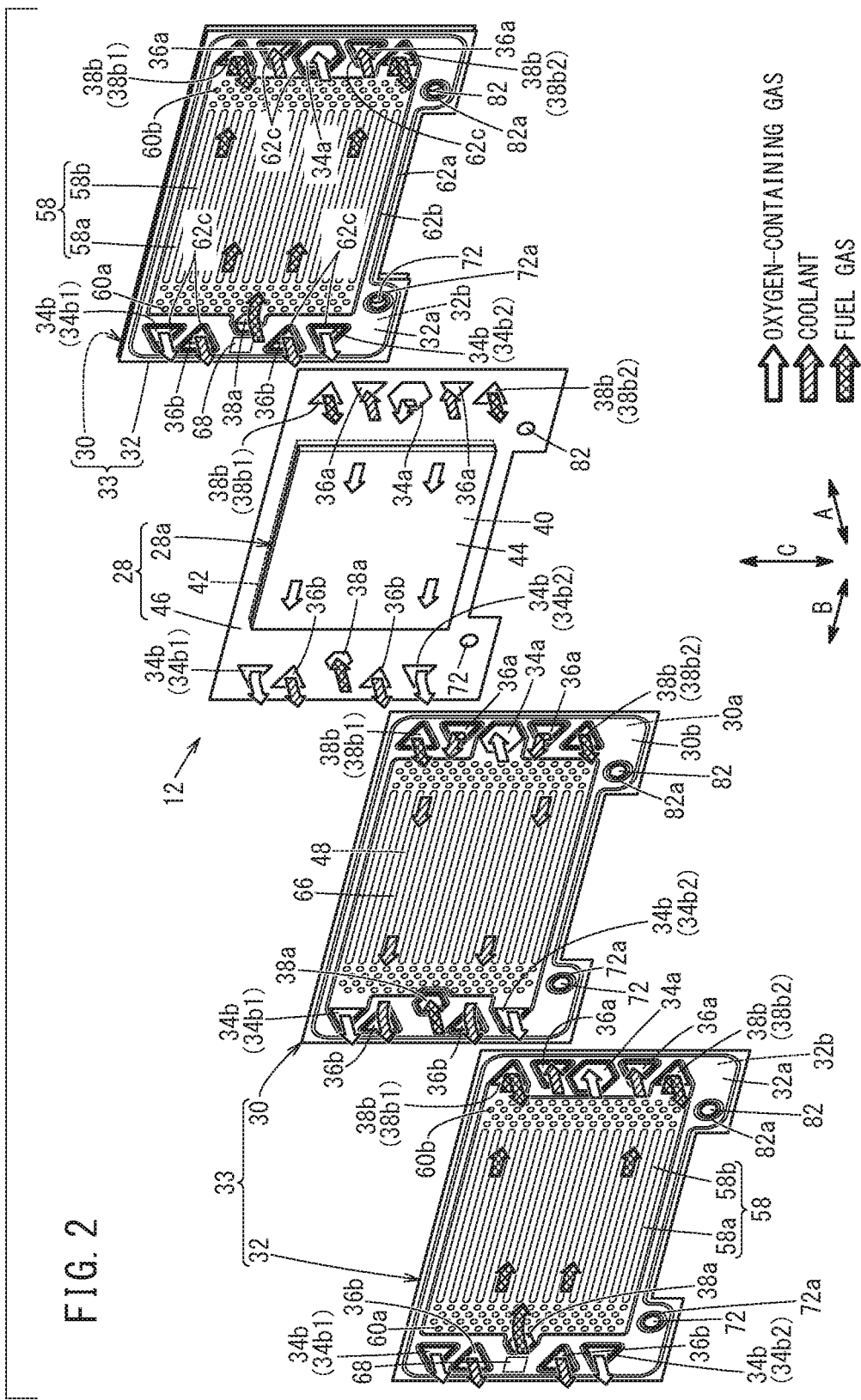
FIG. 2 is an exploded perspective view showing the power generation cell.

As shown in FIG. 2, the fuel cell 12 is formed by sandwiching a resin frame equipped MEA 28 between two separators 30, 32 (fuel cell separators) (hereinafter also referred to as the first separator 30 and the second separator 32, respectively). Each of the first separator 30 and the second separator 32 is formed by press forming of a metal thin plate to have a corrugated shape in cross section. For example, the metal plate is a steel plate, a stainless steel plate, an aluminum plate, a plated steel plate, or a metal plate having an anti-corrosive surface by surface treatment. Outer ends of the first separator 30 and the second separator 32 are joined together by welding, brazing, crimpling, etc. to form a joint separator 33 (fuel cell joint separator).

The resin frame equipped MEA 28 includes a membrane electrode assembly 28a (hereinafter referred to as the "MEA 28a"), and a resin frame member 46 joined to, and around an outer peripheral portion of the MEA 28a. The MEA 28a includes an electrolyte membrane 40, and an anode 42 (first electrode) provided on one surface of the electrolyte membrane 40, and a cathode 44 (second electrode) provided on the other surface of the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

Though not shown in detail, the anode 42 includes a first electrode catalyst layer joined to one surface of the electrolyte membrane 40, and a first gas diffusion layer stacked on the first electrode catalyst layer. The cathode 44 includes a second electrode catalyst layer joined to the other surface of the electrolyte membrane 40, and a second gas diffusion layer stacked on the second electrode catalyst layer.

At one end of the fuel cell 12 in a longitudinal direction indicated by an arrow B (horizontal direction in FIG. 2), one oxygen-containing gas supply passage 34a (reactant gas supply passage), two coolant supply passages 36a, and two fuel gas discharge passages 38b (reactant gas discharge passages) are provided. The oxygen-containing gas supply passage 34a, the two coolant supply passages 36a, and the two fuel gas discharge passages 38b extend through the fuel cell 12 in the stacking direction. The oxygen-containing gas supply passage 34a, the plurality of coolant supply passages 36a, and the plurality of fuel gas discharge passages 38b extend through the stack body 14, the insulator 18a, and the end plate 20a in the stacking direction (The oxygen-containing gas supply passage 34a, the plurality of coolant supply passages 36a, and the plurality of fuel gas discharge passages 38b may extend through the terminal plate 16a.). These fluid passages are arranged in the vertical direction at substantially equal intervals. A fuel gas such as a hydrogen gas (one of reactant gases) is discharged through the fuel gas discharge passages 38b. An oxygen-containing gas (the other of reactant gases) is supplied through the oxygen-containing gas supply passage 34a. A coolant is supplied through the coolant supply passages 36a.

The oxygen-containing gas supply passage 34a is positioned between the two coolant supply passages 36a that are provided vertically at a distance. The two fuel gas discharge passages 38b include an upper fuel gas discharge passage 38b1 and a lower fuel gas discharge passage 38b2. The upper fuel gas discharge passage 38b1 is positioned above the upper coolant supply passage 36*a*. The lower fuel gas discharge passage 38*b*2 is positioned below the lower coolant supply passage 36*a*.

At the other end of the fuel cell 12 in a longitudinal direction indicated by the arrow B, one fuel gas supply passage 38*a* (reactant gas supply passage), two coolant discharge passages 36*b*, and two oxygen-containing gas discharge passages 34*b* (reactant gas discharge passages) are provided. The fuel gas supply passage 38*a*, the two coolant discharge passages 36*b*, and the two oxygen-containing gas discharge passages 34*b* extend through the fuel cell 12 in the stacking direction. The fuel gas supply passage 38*a*, the two coolant discharge passages 36*b*, and the two oxygen-containing gas discharge passages 34*b* extend through the stack body 14, the insulator 18*a*, and the end plate 20*a* in the stacking direction (The fuel gas supply passage 38*a*, the two coolant discharge passages 36*b*, and the two oxygen-containing gas discharge passages 34*b* may extend through the terminal plate 16*a*.). These fluid passages are arranged in the vertical direction at substantially equal intervals. The fuel gas is supplied through the fuel gas supply passages 38*a*. The coolant is discharged through the coolant discharge passages 36*b*. The oxygen-containing gas is discharged through the oxygen-containing gas discharge passage 34*b*. The layout of the oxygen-containing gas supply passage 34*a*, the two oxygen-containing gas discharge passages 34*b*, the fuel gas supply passage 38*a*, and the two fuel gas discharge passages 38*b* is not limited to the above embodiment, and may be changed as necessary depending on the required specification.

The fuel gas supply passage 38*a* is positioned between the two coolant discharge passages 36*b* that are provided vertically at a distance. The two oxygen-containing gas discharge passages 34*b* include an upper oxygen-containing gas discharge passage 34*b*1 and a lower oxygen-containing gas discharge passage 34*b*2. The upper oxygen-containing gas discharge passage 34*b*1 is positioned above the upper coolant discharge passage 36*b*. The lower oxygen-containing gas discharge passage 34*b*2 is positioned below the lower coolant discharge passage 36*b*.

As shown in FIG. 1, the oxygen-containing gas supply passage 34*a*, the coolant supply passages 36*a*, and the fuel gas discharge passages 38*b* are connected to inlets 35*a*, 37*a*, and outlets 39*b* provided in the end plate 20*a*. Further, the oxygen-containing gas discharge passages 34*b*, the coolant discharge passages 36*b*, and the fuel gas supply passage 38*a* are connected to outlets 35*b*, 37*b*, and an inlet 39*a* provided in the end plate 20*a*.

As shown in FIG. 2, at one end of the resin frame member 46 in the direction indicated by the arrow B, an oxygen-containing gas supply passage 34*a*, two coolant supply passages 36*a*, and two fuel gas discharge passages 38*b* are provided. At the other end of the resin frame member 46 in the direction indicated by the arrow B, the fuel gas supply passage 38*a*, the two coolant discharge passages 36*b*, and the two oxygen-containing gas discharge passages 34*b* are provided.

It should be noted that the electrolyte membrane 40 may be configured to protrude outward without using the resin frame member 46. Alternatively, a frame shaped film may be provided on both sides of the electrolyte membrane 40 which protrude outward.

Figure 3:
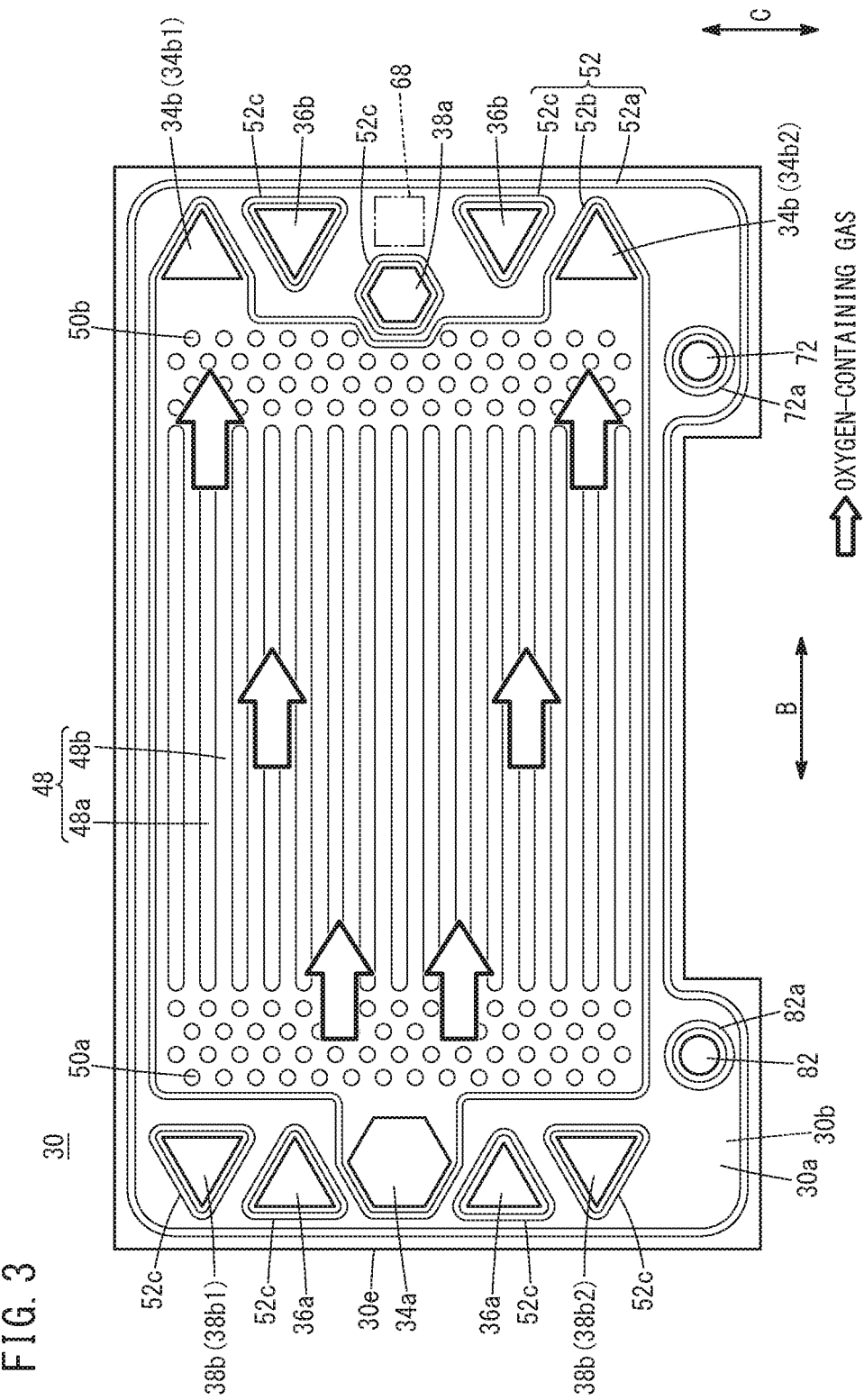
FIG. 3 is a plan view showing a first separator.

As shown in FIG. 3, the first separator 30 has an oxygen-containing gas flow field 48 on its surface 30*a* facing the resin frame equipped MEA 28. For example, the oxygen-containing gas flow field 48 extends in the direction indicated by the arrow B. The oxygen-containing gas flow field 48 is connected to (in fluid communication with) the oxygen-containing gas supply passage 34*a* and the two oxygen-containing gas discharge passage 34*b*. The oxygen-containing gas flow field 48 includes straight flow grooves (or wavy flow grooves) 48*b* between a plurality of ridges 48*a* extending in the direction indicated by the arrow B.

The opening area of the oxygen-containing gas supply passage 34*a* is larger than the opening area of the fuel gas supply passage 38*a*. As in the case of the illustrated embodiment, for example, the oxygen-containing gas supply passage 34*a* has a hexagonal shape. The oxygen-containing gas supply passage 34*a* may have a shape (e.g., rectangular shape) other than the hexagonal shape. For example, as in the case of the illustrated embodiment, the pair of oxygen-containing gas discharge passages 34*b* have a triangular shape. The oxygen-containing gas discharge passage 34*b* may have a triangular shape having rounded corners. Alternatively, the oxygen-containing gas discharge passage 34*b* may have a triangular shape having corners chamfered in a straight pattern (in effect, hexagonal shape).

An inlet buffer 50*a* is formed by press forming between the oxygen-containing gas supply passage 34*a* and the oxygen-containing gas flow field 48. The inlet buffer 50*a* includes a plurality of bosses protruding toward the resin frame equipped MEA 28. An outlet buffer 50*b* is formed by press forming between the oxygen-containing gas discharge passage 34*b* and the oxygen-containing gas flow field 48. The outlet buffer 50*b* includes a plurality of bosses protruding toward the resin frame equipped MEA 28.

A seal member is provided on a surface 30*a* of the first separator 30. For example, as a seal member, a plurality of metal bead seals 52 are formed integrally with the surface 30*a* of the first separator 30 by press forming to protrude toward the resin frame equipped MEA 28. Instead of the metal bead seal 52, a protruding elastic seal made of elastic material may be provided. The plurality of metal bead seals 52 include an outer bead 52*a*, an inner bead 52*b*, and a plurality of passage beads 52*c*. The outer bead 52*a* is formed around the outer peripheral portion of the surface 30*a*. The inner bead 52*b* is formed around the oxygen-containing gas flow field 48, the oxygen-containing gas supply passage 34*a*, and the two oxygen-containing gas discharge passages 34*b* while allowing the oxygen-containing gas flow field 48 to be connected to the oxygen-containing gas supply passage 34*a* and the two oxygen-containing gas discharge passages 34*b*.

The plurality of passage beads 52*c* are formed around the fuel gas supply passage 38*a*, the two fuel gas discharge passages 38*b*, the two coolant supply passages 36*a*, and the two coolant discharge passages 36*b*, respectively. The outer bead 52*a* may be provided as necessary. The outer bead 52*a* may be dispensed with.

As shown in FIG. 4, the second separator 32 has a fuel gas flow field 58 on its surface 32*a* facing the resin frame equipped MEA 28. For example, the fuel gas flow field 58 extends in the direction indicated by the arrow B. The fuel gas flow field 58 is connected to (in fluid communication with) the fuel gas supply passage 38*a* and the two fuel gas discharge passages 38*b*. The fuel gas flow field 58 includes straight flow grooves (or wavy flow grooves) 58*b* between a plurality of rides 58*a* extending in the direction indicated by the arrow B.

As in the case of the illustrated embodiment, for example, the fuel gas supply passage 38*a* has a hexagonal shape. The fuel gas supply passage 38*a* may have a shape (e.g., rectangular shape) other than the hexagonal shape. As in the case of the illustrated embodiment, for example, the pair of fuel gas discharge passages 38*b* have a triangular shape. The fuel gas discharge passage 38b may have a triangular shape having rounded corners. Alternatively, the fuel gas discharge passages 38b may be a triangular shape having corners chamfered in a straight pattern (in effect, hexagonal shape).

An inlet buffer 60a is formed by press forming between the fuel gas supply passage 38a and the fuel gas flow field 58. The inlet buffer 60a includes a plurality of bossed protruding toward the resin frame equipped MEA 28. An outlet buffer 60b is formed by press forming between the fuel gas discharge passage 38b and the fuel gas flow field 58. The outlet buffer 60b includes a plurality of bosses protruding toward the resin frame equipped MEA 28.

Seal members are provided on the surface 32a of the second separator 32. For example, as the seal members, a plurality of bead seals 62 are formed by press forming. The metal bead seals 62 are expanded toward the resin frame equipped MEA 28. Instead of the metal bead seals 62, ridge shaped elastic seals made of elastic material may be provided. A plurality of metal bead seals 62 include an outer bead 62a, an inner bead 62b, and a plurality of passage beads 62c. The outer bead 62a is formed around the outer marginal portion of the surface 32a. The inner bead 62b is provided inside the outer bead 62a, around the fuel gas flow field 58, the fuel gas supply passage 38a, and the two fuel gas discharge passages 38b, while allowing the fuel gas flow field 58 to be connected to the fuel gas supply passage 38a and the two fuel gas discharge passages 38b.

The plurality of passage beads 62c are provided around the oxygen-containing gas supply passage 34a, the two oxygen-containing gas discharge passage 34b, the two coolant supply passages 36a, and the two coolant discharge passages 36b, respectively. The outer bead 62a may be provided as necessary. The outer bead 62a may be dispensed with.

The fuel gas supply passage 38a is provided at a central position of one side (32s1) of the opposing sides 32s1, 32s2 of the rectangular second separator 32 (two short sides of the rectangular second separator 32). The fuel gas supply passage 38a is provided close to the fuel gas flow field 58 in comparison with the any of other fluid passages provided along the one side 32s1. That is, a position 38a1 of the fuel gas supply passage 38a closest to the fuel gas flow field 58 is adjacent (close) to the fuel gas flow field 58 in comparison with the position of any of the other fluid passages provided along the one side 32s1 closest to the fuel gas flow field 58 (e.g., a position 36b1 of the coolant discharge passage 36b closest to the fuel gas flow field 58). Therefore, the fuel gas supply passage 38a is shifted toward the fuel gas flow field 58 by the distance A from any of the other fluid passages provided along the one side 32s1.

Further, a position 38a2 of the fuel gas supply passage 38a remotest from the fuel gas flow field 58 is close to the fuel gas flow field 58 in comparison with the position of any of the other fluid passages provided along the side 32s1 (e.g., a position 36b2 of the coolant discharge passage 36b remotest from the fuel gas flow field 58) remotest from the fuel gas flow field 58. Therefore, the position 38a2 of the fuel gas supply passage 38a remotest from the fuel gas flow field 58 is shifted toward the fuel gas flow field 58 by the distance B, from the position of the other fluid passages provided along the one side 32s1 (e.g., the position 36b2 of the coolant discharge passage 36b) remotest from the fuel gas flow field 58. The distance A and the distance B may be the same, or may be different.

In the flow field direction of the fuel gas flow field 58 indicated by the arrow B, the position of the fuel gas supply passage 38a is partially overlapped with the positions of the other fluid passages (the pair of oxygen-containing gas discharge passages 34b and the pair of coolant discharge passages 36b) provided along the one side 32s1. The opening area of the fuel gas supply passage 38a is smaller than the opening area of any of the other fluid passages provided along the one side 32s1.

The second separator 32 has an identification mark 68 of the second separator 32, on its surface 32a between the fuel gas supply passage 38a and an outer peripheral end 32e of the second separator 32 (the outer peripheral end 32e along the one side 32s1). The identification mark 68 is provided between the pair of coolant discharge passages 36b. The identification mark 68 is provided at a position facing the resin frame equipped MEA 28 (more specifically, the resin frame member 46) shown in FIG. 2. The identification mark 68 is provided between the outer bead 62a and the inner bead 62b.

For example, the identification mark 68 is in the form of a matrix type two-dimensional code, a barcode (one dimensional code). Examples of methods of forming the identification mark 68 include laser marking, labeling, printing (ink jet printing, etc.). Examples of information identified by the identification mark 68 include a lot number, a production date, a separator type, and a production condition (additional information).

The pair of fuel gas discharge passages 38b are provided in the other side (32s2) of the opposing sides 32s1, 32s2 of the second separator 32, on both sides opposing the fuel gas supply passage 38a.

It should be noted that the identification mark 68 may be provided in the surface 30a of the first separator 30 shown in FIG. 3, between the oxygen-containing gas supply passage 34a and an outer peripheral end 30e of the first separator 30. In this case, in order to provide a sufficient space for the identification mark 68, the oxygen-containing gas supply passage 34a will be provided close to the oxygen-containing gas flow field 48, in comparison with any of the other fluid passages provided along the side on one end of the first separator 30 in the longitudinal direction. In FIG. 3, as shown by a virtual line, the identification mark 68 may be provided in the surface 30a of the first separator 30, between the fuel gas supply passage 38a and the outer peripheral end 30e of the first separator 30.

In FIG. 2, a coolant flow field 66 is formed between the coolant supply passage 36a and the coolant discharge passage 36b, between a surface 30b of the first separator 30 and a surface 32b of the second separator 32 that are joined together by welding or brazing. The coolant flow field 66 is connected to (in fluid communication with) the coolant supply passage 36a and the coolant discharge passage 36b. The coolant flow field 66 is formed by stacking the back surface of the oxygen-containing gas flow field 48 of the first separator 30 and the back surface of the fuel gas flow field 58 of the second separator 32.

As shown in FIGS. 2 to 4, each of the pair of the coolant supply passages 36a and the pair of the coolant discharge passages 36b has a triangular shape. Each of the pair of coolant supply passage 36a and the pair of coolant discharge passages 36b has vertices of the triangle oriented toward the oxygen-containing gas flow field 48 and the fuel gas flow field 58. The pair of coolant supply passages 36a and the pair of coolant discharge passages 36b may have a triangular shape having rounded corners, or a triangular shape having corners chamfered in a straight pattern (in effect, hexagonal shape). Unlike the embodiment of the present invention, the pair of coolant supply passages 36a may be provided on both sides of the fuel gas supply passage 38a, and the pair of coolant discharge passages 36b may be provided on both sides of the oxygen-containing gas supply passage 34a.

As shown in FIG. 2, a first drain 72 is provided for the fuel cell stack 10. During operation (power generation) of the fuel cell stack 10, the first drain 72 discharges water produced at the cathode of the fuel cell stack 10. The first drain 72 penetrates through the resin frame member 46, the first separator 30, and the second separator 32 in the stacking direction indicated by the arrow A. The first drain 72 is connected to the oxygen-containing gas discharge passage 34b through a first connection channel (not shown) provided at the end (e.g., the insulator 18b) of the end plate 20b of the fuel cell stack 10. The first drain 72 is provided below the bottom of the lower oxygen-containing gas discharge passage 34b2.

In the first separator 30 and the second separator 32, a bead seal 72a for preventing leakage of the produced water is provided in the outer periphery of the first drain 72. The bead seal 72a protrudes toward the resin frame equipped MEA 28 adjacent to the first separator 30 and the second separator 32 in the thickness direction, and has a ring shape formed around the first drain 72.

A second drain 82 is provided for the fuel cell stack 10 for discharging water produced at the anode of the fuel cell stack 10 during operation (power generation) of the fuel cell stack 10. The second drain 82 penetrates through the resin frame member 46, the first separator 30, and the second separator 32 in the stacking direction indicated by the arrow A. The second drain 82 is connected to the fuel gas discharge passage 38b through a second connection channel (not shown) provided at the end (e.g., the insulator 18b) of the end plate 20b of the fuel cell stack 10. The second drain 82 is provided below the bottom of the lower fuel gas discharge passage 38b2.

In the first separator 30 and the second separator 32, a bead seal 82a for preventing leakage of the produced water is provided in the outer periphery of the second drain 82. The bead seal 82a protrudes toward the resin frame equipped MEA 28 adjacent to the first separator 30 and the second separator 32 in the thickness direction, respectively, and the bead seal 82a has a ring shape around the second drain 82.

Operation of the fuel cell stack 10 having this structure will be described below.

Firstly, as shown in FIG. 1, an oxygen-containing gas such as air is supplied to the oxygen-containing gas supply passage 34a (inlet 35a) of the end plate 20a. A fuel gas such as a hydrogen-containing gas is supplied to the fuel gas supply passage 38a (inlet 39a) of the end plate 20a. A coolant such as pure water, ethylene glycol, or oil is supplied to the coolant supply passages 36a (inlets 37a) of the end plate 20a.

As shown in FIG. 3, the oxygen-containing gas flows from the oxygen-containing gas supply passage 34a into the oxygen-containing gas flow field 48 of the first separator 30. The oxygen-containing gas flows along the oxygen-containing gas flow field 48 in the direction indicated by the arrow B, and the oxygen-containing gas is supplied to the cathode 44 of the MEA 28a.

In the meanwhile, as shown in FIG. 4, the fuel gas flows from the fuel gas supply passage 38a into the fuel gas flow field 58 of the second separator 32. The fuel gas flows along the fuel gas flow field 58 in the direction indicated by the arrow B, and the fuel gas is supplied to the anode 42 of the MEA 28a.

Thus, in each of the MEAs 28a, the oxygen-containing gas supplied to the cathode 44 and the fuel gas supplied to the anode 42 are partially consumed in electrochemical reactions in the second electrode catalyst layer and the first electrode catalyst layer to generate electricity.

Then, as shown in FIG. 2, the oxygen-containing gas supplied to the cathode 44 is partially consumed at the cathode 44, and the oxygen-containing gas is discharged along the oxygen-containing gas discharge passage 34b in the direction indicated by the arrow A. Likewise, the fuel gas supplied to the anode 42 is partially consumed at the anode 42, and the fuel gas is discharged along the fuel gas discharge passage 38b in the direction indicated by the arrow A.

Further, the coolant supplied to the coolant supply passage 36a flows into the coolant flow field 66 formed between the first separator 30 and the second separator 32. Then, the coolant flows in the direction indicated by the arrow B. After coolant cools the MEA 28a, the coolant is discharged from the coolant discharge passage 36b.

The separator 32, the joint separator 33, and the power generation cell 12 according to the embodiment of the present invention offer the following advantages.

The reactant gas supply passage (fuel gas supply passage 38a) provided on one side 32s1 of the separator 32 (joint separator 33) of the power generation cell 12 is provided close to the reactant gas flow field (fuel gas flow field 58) in comparison with any of other fluid passages (the pair of oxygen-containing gas discharge passages 34b, the pair of coolant discharge passages 36b) provided along the one side 32s1. Further, the identification mark 68 of the separator 32 (joint separator 33) is provided between the reactant gas supply passage and the outer peripheral end 32e of the separator 32 (joint separator 33). In the structure, it is possible to easily provide a space for the identification mark 68 in the separator surface. Accordingly, it becomes possible to provide the identification mark 68 having the desired quantity of information in the separator surface easily. It should be noted that the reactant gas supply passage may be the oxygen-containing gas supply passage 34a.

The opening area of the reactant gas supply passage (fuel gas supply passage 38a) is smaller than the opening area of any of the other fluid passages provided along the one side 32s1 of the separator 32. As described above, since the space for the identification mark 68 is provided between the reactant gas supply passage (fuel gas supply passage 38a) having the small opening area in comparison with the other fluid passages and the outer peripheral end 32e of the separator 32, it is possible to provide the sufficient space for the identification mark 68.

The embodiment of the present invention adopts so called cell-by-cell cooling structure where each of cell units is formed by sandwiching a membrane electrode assembly between two metal separators, and a coolant flow field is formed between the adjacent unit cells. Alternatively, it may be possible to adopt skip cooling structure where each of cell units includes three or more metal separators and two or more membrane electrode assemblies, the cell unit is formed by stacking the metal separators and the membrane electrode assemblies alternately, and a coolant flow field is formed between the adjacent unit cells.

The present invention is not limited to the above described embodiment. Various modifications may be made without deviating from the gist of the present invention.

What is claimed is:

1. A rectangular fuel cell separator comprising:
   a reactant gas flow field configured to allow a reactant gas to flow in a separator surface direction; and
   a plurality of fluid passages extending through the fuel cell separator in a separator thickness direction, and formed along opposing sides of the fuel cell separator, on both sides of the reactant gas flow field, wherein a reactant gas supply passage is provided at a central position of one side of the opposing sides of the fuel cell separator;

a pair of reactant gas discharge passages are provided in another side of the opposing sides of the fuel cell separator, on both sides of a position opposing the reactant gas supply passage;

the reactant gas supply passage is provided at a position closest to the reactant gas flow field among the plurality of fluid passages provided along the one side;

an identification mark of the fuel cell separator is provided between the reactant gas supply passage and an outer peripheral end of the fuel cell separator;

the reactant gas flow field allows the reactant gas to be distributed from the reactant gas supply passage toward the pair of reactant gas discharge passages on both sides of the position opposing the reactant gas supply passage; and the reactant gas supply passage and the identification mark are arranged side by side in a direction perpendicular to the opposing sides of the fuel cell separator.

2. The fuel cell separator according to claim 1, wherein the reactant gas supply passage is a fuel gas supply passage; and the pair of reactant discharge passages are a pair of fuel gas discharge passages.

3. The fuel cell separator according to claim 1, wherein a pair of coolant passages are provided on both sides of the reactant gas supply passage along the one side; and a pair of other reactant gas discharge passages are provided on both sides of the pair of coolant passages along the one side.

4. The fuel cell separator according to claim 1, wherein an opening area of the reactant gas supply passage is smallest among the plurality of fluid passages provided along the one side.

5. The fuel cell separator according to claim 1, in the other side of the opposing sides of the fuel cell separator, another reactant gas supply passage having a large opening area in comparison with the reactant gas supply passage at the one side is provided.

6. The fuel cell separator according to claim 3, wherein the identification mark is positioned between one and another of the pair of coolant passages.

7. A rectangular fuel cell joint separator comprising;

a first reactant gas flow field provided on one surface of the fuel cell separator, and configured to allow a first reactant gas to flow in a separator surface direction;

a second reactant gas flow field provided on another surface of the fuel cell separator, and configured to allow a second reactant gas to flow in the separator surface direction; and a plurality of fluid passages extending through the fuel cell joint separator in a separator thickness direction, and formed along opposing sides of the first reactant gas flow field and the second reactant gas flow field, wherein the fuel cell joint separator is formed by joining a first separator having the first reactant gas flow field and a second separator having the second reactant gas flow field together, a reactant gas supply passage is provided at a central position of one side of the opposing sides of the fuel cell joint separator;

a pair of reactant gas discharge passages are provided in another side of the opposing sides of the fuel cell joint separator, on both sides of a position opposing the reactant gas supply passage;

the reactant gas supply passage is provided at a position closest to the first reactant gas flow field or the second reactant gas flow field among the plurality of fluid passages provided along the one side;

an identification mark of the fuel cell joint separator is provided between the reactant gas supply passage and an outer peripheral end of the fuel cell joint separator;

the reactant gas flow field allows the reactant gas to be distributed from the reactant gas supply passage toward the pair of reactant gas discharge passages on both sides of the position opposing the reactant gas supply passage; and the reactant gas supply passage and the identification mark are arranged side by side in a direction perpendicular to the opposing sides of the fuel cell separator.

8. A power generation cell comprising a pair of rectangular fuel cell separators and a membrane electrode assembly sandwiched between the pair of fuel cell separators, wherein one of the fuel cell separators comprises a reactant gas flow field configured to allow a reactant gas to flow in a separator surface direction, and a plurality of fluid passages extending through the one fuel cell separator in a separator thickness direction, and formed along opposing sides of the one rectangular fuel cell separator, on both sides of the reactant gas flow field, wherein a reactant gas supply passage is provided at a central position of one side of the opposing sides of the one fuel cell separator;

a pair of reactant gas discharge passages are provided in another side of the opposing sides of the one fuel cell separator, on both sides of a position opposing the reactant gas supply passage;

the reactant gas supply passage is provided at a position closest to the reactant gas flow field among the plurality of fluid passages provided along the one side;

an identification mark of the fuel cell separator is provided between the reactant gas supply passage and an outer peripheral end of the one fuel cell separator; and the reactant gas flow field allows the reactant gas to be distributed from the reactant gas supply passage toward the pair of reactant gas discharge passages on both sides of the position opposing the reactant gas supply passage; and the reactant gas supply passage and the identification mark are arranged side by side in a direction perpendicular to the opposing sides of the fuel cell separator.

* * * * *